United States Patent [19]

Endo et al.

[11] Patent Number: 4,893,293

[45] Date of Patent: Jan. 9, 1990

[54] METHOD FOR OPERATING MULTIDISK PLAYER

[75] Inventors: Fumio Endo; Toshiyuki Kimura; Yoshio Aoyagi, all of Saitama, Japan

[73] Assignee: Pioneer Electronic Corporation, Tokyo, Japan

[21] Appl. No.: 296,386

[22] Filed: Dec. 21, 1988

Related U.S. Application Data

[62] Division of Ser. No. 164,027, Mar. 4, 1988, abandoned.

[30] Foreign Application Priority Data

| Mar. 4, 1987 | [JP] | Japan | 62-47788 |
| Mar. 4, 1987 | [JP] | Japan | 62-47789 |
| Mar. 4, 1987 | [JP] | Japan | 62-47792 |

[51] Int. Cl.$^4$ .............................................. G11B 17/22
[52] U.S. Cl. ......................................... 369/34; 369/33
[58] Field of Search .............................. 369/32, 33, 34

[56] References Cited

U.S. PATENT DOCUMENTS

| 4,538,253 | 8/1985 | Ishibashi et al. | 369/34 |
| 4,539,663 | 9/1985 | Ishibashi et al. | 369/34 |
| 4,561,078 | 12/1985 | Nakayama | 369/36 |
| 4,610,008 | 9/1986 | Ishibashi et al. | 369/34 |
| 4,653,037 | 3/1987 | Nakayama et al. | 369/34 |
| 4,667,314 | 5/1987 | Iwashima | 369/32 |
| 4,675,856 | 6/1987 | Rudy et al. | 369/34 |
| 4,706,233 | 11/1987 | D'Alayer | 369/34 |
| 4,730,291 | 3/1988 | Ikedo | 369/36 |
| 4,754,397 | 6/1988 | Rooshabh | 369/34 |
| 4,757,401 | 7/1988 | Tetanishi | 369/34 |

FOREIGN PATENT DOCUMENTS 0173136 5/1986 European Pat. Off. .
3607586 2/1986 Fed. Rep. of Germany .

Primary Examiner—Steven L. Stephan
Attorney, Agent, or Firm—Sughrue, Mion, Zinn, Macpeak & Seas

[57] ABSTRACT

A method for operating a disk player in which playing can be continued, even if the selected disk cannot be played for one reason or the other and in with which damage to disks, such as may be caused by vibration in a vehicle-based disk player system, is effectively prevented. When the presence of a magazine set in the disk player is initially detected, trays from the magazine are conveyed one by one to a playing position. When no disk is detected on the trays thus conveyed, the respective magazine is ejected.

2 Claims, 4 Drawing Sheets

METHOD, FOR OPERATING MULTIDISK PLAYER

This is a division of application Ser. No. 164,027, filed on Mar. 4, 1988, now abandoned.

BACKGROUND OF THE INVENTION

The present invention relates to a disk player in which a magazine containing a number of disks is loaded into the player, and the disks are selectively played back.

A conventional disk player for playing disks extracted from a magazine has the following problems:

(1) In the conventional disk player, sometimes no disk is available on the selected tray in the magazine. In this case, the disk player operates as follows: When a disk on a tray is specified, the tray is pulled out of the magazine to locate the disk thus specified. When it is determined that the specified disk is not available, the tray is put back into the magazine and the disk player is placed in a standby state.

Therefore, in the case where no disk is provided in the magazine, whenever such a disk is selected or specified by the operator, the above-described operation is carried out in vain, thus wasting time. Accordingly, operator must restart the player after manually confirming that another disk or disks are available in the magazine.

In the case of a disk player installed on a vehicle, sometimes the drive section of the disk player is disposed in a location such as the trunk which the operator cannot reach, while the control section is located near the operator's seat. In this case, it is considerably troublesome to confirm the presence or absence of disks.

(2) Furthermore, in the conventional disk player, playback of the disk sometimes becomes impossible due to tracking errors caused, for instance, by external vibration. In such a case, playback of the disk s suspended or the disk is put back into the magazine and the reproducing operation is suspended.

A disk player employing a magazine holding a number of disks is of course larger in size than a disk player which has no such a magazine. Therefore, when it is required to install the former type of disk on a vehicle, it is difficult to position it on the front instrument panel so that the operator can reach it with ease. Thus the drive section the disk player is usually installed in a location which the operator inside the vehicle cannot reach, for instance, in the trunk of the vehicle, while the control section of the disk player is installed near the operator's seat.

If a multidisk player of this type is operated in the above-described manner in which the reproducing operation is suspended whenever the playback of a disk becomes impossible, the player suffers from a difficulty that, even in the case where the playback of only the disk on the turntable is impossible, the magazine must be taken out of the trunk to exchange the disk for another.

(3) Still further, in the conventional disk player, when a disk is specified or selected, the tray bearing the disk is pulled out of the magazine and the disk is placed on the turntable for reproduction. When a playback suspending operation is carried out during reproduction, the spindle motor is stopped with the disk clamped on the turntable. In the ejecting operation, the disk is released from the turntable and returned to the tray. The tray bearing the disk is put back into the magazine, thus leaving the disk player.

As described above, in the conventional disk player, the disk is held clamped on the turntable when the playback suspending operation is carried out during reproduction. In the case where the disk player is installed on a vehicle, since the disk is clamped on the turntable, the disk may be scratched by a metal part of the disk player due to vibration during the movement of the vehicle.

SUMMARY OF THE INVENTION

The present invention has been achieved to solve the above-described problems of the conventional disk player.

A specific object of the present inventIon is to provide a disk player which is easy to operate and in which there is no danger of the disk being damaged.

In order to achieve the above and other objects, the present invention provides a disk player in which:

(1) Detection of the presence or absence of a disk in all the trays in a magazine is performed prior to the selection of any of the trays.

(2) After selection of a tray has been effected, in the case where the disk on the selected tray be reproduced, operation of the disk player is not stopped immediately. The disk player detects whether or not a disk on another tray can be reproduced. If the disk is in a reproducible condition, the disk player reproduces that disk. The disk player stops operating only when none of the disks on any of the trays can be reproduced.

(3) After stopping the reproduction of a disk, the disk is moved back onto its tray and transferred into the magazine.

That is, according to the present invention, in a disk player in which a desired tray is pulled out of a magazine having a plurality of trays and the disk on the tray thus pulled out is played back, when the magazine is first loaded in the disk player, all the trays are pulled out successively to detect the presence or absence of a disk, and when none of the trays carries a disk, the magazine is ejected from the disk player.

Furthermore, in a multidisk player, when it is detected that the playback of a disk set on the turntable is impossible, the disk is put back into the magazine and another disk is set on the turntable for reproduction, and only when it is determined that none of the disks can be played back, is the reproducing operation suspended.

Yet further, according to the present invention, when a reproduction suspending operation is carried out while a disk is being played, the playback of the disk is suspended, the disk is returned to its tray, and the tray is put back into the magazine.

DESCRIPTION OF THE PREFERRED EMBODIMENTS

Preferred embodiments of the present invention will be hereinafter described in detail with reference to the accompanying drawing.

Figure 1:
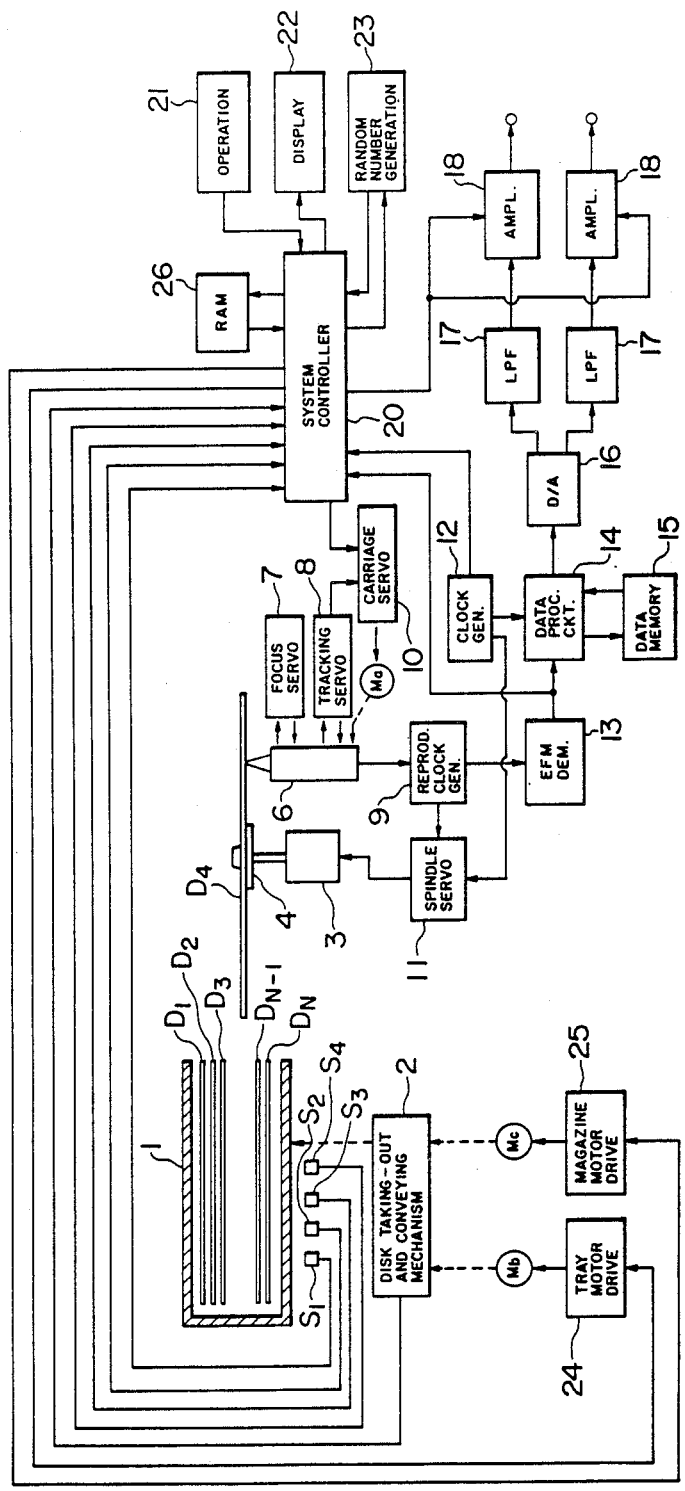
FIG. 1 is a block diagram showing a disk player of the present invention for achieving functions illustrated in FIGS. 2 to 4.

A disk player to which the present invention can be applied will first be described with reference to FIG. 1. In FIG. 1, reference numeral designates a magazine in which N disks (N being a natural number larger than one) are arranged in order. The magazine 1 has N trays to bear the disks. The trays can freely move in and out of the magazine 1. The magazine is detachably mounted on the disk player at a predetermined position. One of the N disks $D_1$ through $D_N$ laid on the N trays located at one of a plurality of disk accommodating positions is conveyed by a disk extracting and conveying mechanism 2 to the disk bearing surface of a turntable 4, secured to the rotary shaft of a spindle motor 3, and then clamped. The disk extracting and conveying mechanism 2 includes an ejecting member for ejecting a tray from the magazine and moving the disk to the disk bearing surface of the turntable 4, a clamping mechanism for clamping the disk placed on the disk bearing surface of the turntable 4 by the ejecting member, a moving plate for changing the position of the ejecting member relative to the magazine 1 in the direction of arrangement of the trays, and sensors for detecting the position of the moving plate and the operation of the clamping mechanism. In the disk extracting and conveying mechanism, the moving plate is moved to change the position of the ejecting member so that a desired disk can be extracted. The arrangement and construction of the magazine and the disk extracting and conveying mechanism have been described, for instance, in the specification of application U.S. Pat. No. 884,949 in detail.

Data recorded on a disk $D_n$ which has been extracted from the magazine 1 and clamped on the disk bearing surface of the turntable 4 by the disk extracting and conveying mechanism 2 are read by means of an optical pickup 6. The optical pickup 6 includes a laser diode, objective lens, focus actuator, tracking actuator, and photodetector. The output of the pickup 6 is applied to a focus servo circuit 7, a tracking servo circuit 8, and a reproduction clock generating circuit 9, the latter including an RF amplifier.

In the focus servo circuit 7, a focus error signal is produced, for instance, according to the well-known astigmatism method. The focus actuator in the pickup 6 is driven by the error signal thus generated. As a result, the output laser beam of the laser diode is focused on the recording surface of the disk $D_n$ through the objective lens, thus forming a data detecting light spot. In the tracking servo circuit 8, a tracking error signal is produced, for instance, using the well-known push-pull method. The tracking error signal is applied to the tracking actuator in the pickup 6, and to a carriage servo circuit 10. The output of the carriage servo circuit 10 is supplied to an electric motor Ma employed to drive a carriage (not shown) supporting the pickup 6 so that the pickup 6 is moved radially of the disk $D_n$.

The reproduction clock generating circuit 9 produces a demodulating reproduction clock signal, which is applied to a spindle servo circuit 11. In the spindle servo circuit 11, a drive signal is generated indicative of the phase difference between the reproduction clock signal and a reference clock signal outputted by a clock generating circuit 12. The drive signal thus produced drives the spindle motor 3 in such a manner that the track linear velocity of the disk $D_n$ is held constant. The output of the RF amplifier in the reproduction clock generating circuit 9, together with the reproduction clock signal, is applied to an EFM (eight-to-fourteen modulation) demodulating circuit 13 including a frame synchronizing circuit 13. The demodulation output of the EFM demodulating circuit 13 is processed by a data processing circuit 14, which subjects a demodulation data signal to deinterleaving, error detection, correction or complementing. The demodulation output thus processed is stored in a data memory 15, and is then read out with the aid of the clock signal outputted by the clock generating circuit 12. The demodulation output thus read out is applied to a D/A (digital-to-analog) converter 16 where it is converted into an analog signal. The analog signal is applied through LPFs (low-pass filter) 17 to amplifiers 18, which output right and left audio signals. Each of the amplifiers 18 is designed so that its frequency characteristic can be varied by control data.

A control signal in the output data of the EFM demodulating circuit 13 is supplied to a system controller 20 so that various data representing, for instance, music portions, inter-music portions, performance time and disk type number are stored therein. The system controller 20 includes one or more microcomputers including a processor, ROM (read-only memory), RAM (random access memory), interface circuit, and timer. In the system controller 20, the processor operates according to a program according to the flow chart of FIG. 2, 3 or 4 and stored in the ROM to process detection signals outputted by the disk extracting and conveying mechanism 2, key input data provided by an operating section 21, and the output data of a random number generating circuit 23, thereby to supply various instructions and data to the carriage servo circuit 10, the spindle servo circuit 11, the amplifiers 18, a display unit 22, and drive circuits 24 and 25. The random number generating circuit 23 is designed so that, for instance, the output of a base-m counter (m being a natural number) in which the coefficient value changes gradually with a very short period is latched in response to a data output instruction and then outputted. The drive circuits 24 and 25 supply drive current to electric motors Mb and Mc to drive the moving plate and the ejecting member, respectively, in the disk extracting and conveying mechanism 2.

In FIG. 1, reference numeral 26 designates a RAM for storing the output data of the system controller 20.

Further FIG. 1, S1 through S4 designate detecting switches arranged near the magazine 1 mounted on the disk player. More specifically, S1 designates a magazine detecting switch which provides an output when the magazine 1 is mounted on the magazine mount of the disk player; S2, a disk detecting switch for detecting the presence or absence of a disk on the tray ejected from the magazine; S3, a tray detecting switch for detecting whether or not a tray has been put back into the magazine 1; and S4, a magazine position detecting switch for detecting the position of the magazine moving vertically relative to the turntable 4.

Figure 2:
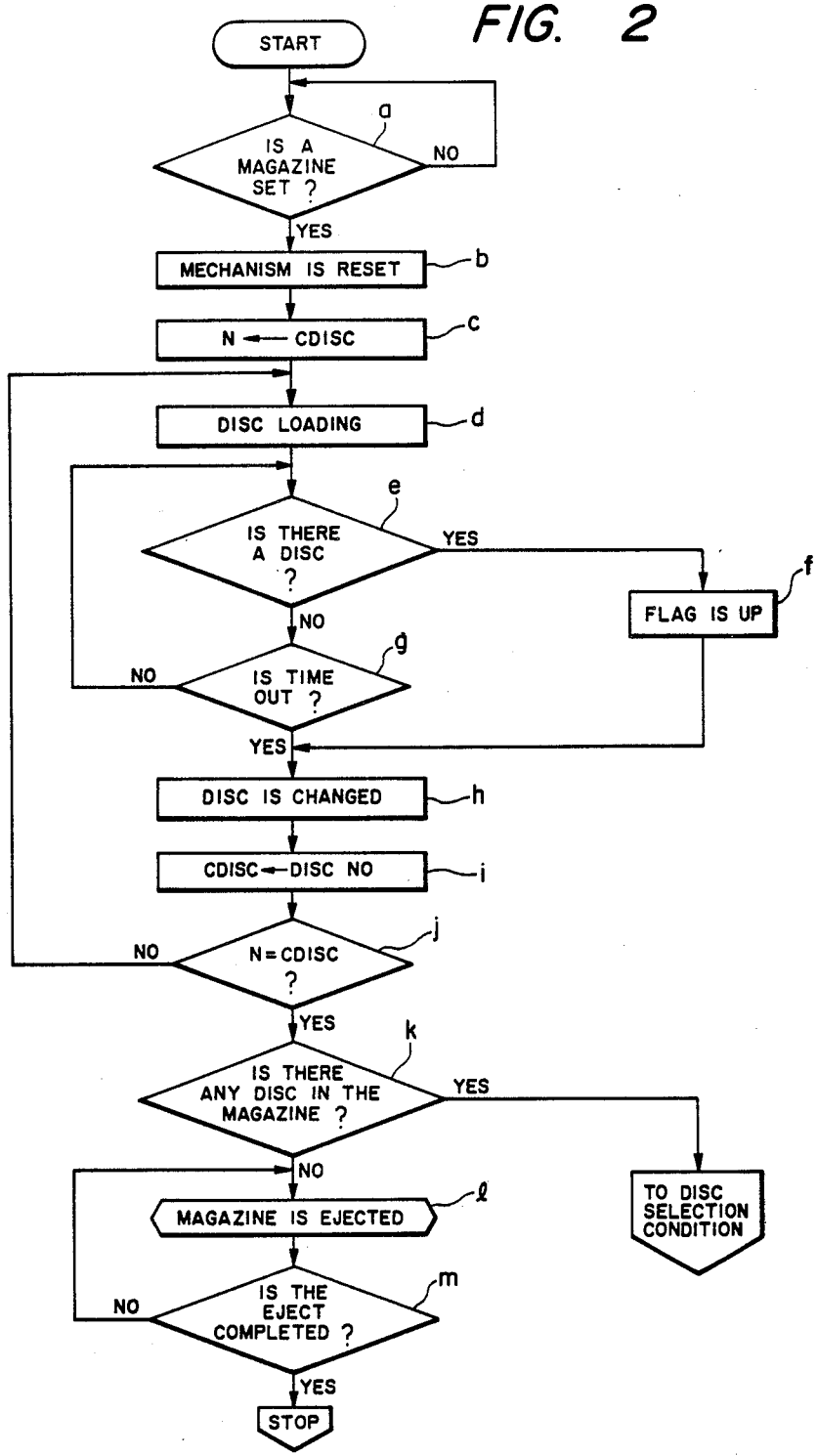
FIG. 2 is a flowchart showing functions of the disk player of FIG. 1 according to a first embodiment of the present invention.

In the first embodiment of the present invention, the operation of the processor in the system controller 20 is as shown in the flowchart of FIG. 2. The first embodiment will thus be hereinafter described in detail with reference to FIG. 2.

When the power switch is turned on, the processor determines whether or not the magazine 1 has been mounted on the magazine mount (Step a). When the magazine detecting switch S1 detects the presence of the magazine 1 and applies the detection signal to the processor 1, the latter determines that the magazine 1 has been mounted as required, and the next step is executed.

In the next step, the magazine 1 is moved vertically to a position where the uppermost or lowermost tray can be pulled out (Step b). When the magazine position detecting switch S4 applies the magazine position signal to the processor, the next Step c is effected.

In this step, the fact that the disk on the extracted tray is the first one is stored in memory (Step c). Thereafter, a loading operation for the disk is carried out (Step d). During the loading operation, the processor detects whether or not a disk is present on the tray (Step e). When the disk detecting switch S2 detects the presence of a disk and outputs the detection signal, the processor determines that the disk has been detected and sets a flag (Step f), whereupon the following step is effected. If, in the disk detecting operation, the detection signal is not outputted by the disk detecting switch S2 for a predetermined period of time, the processor outputs a decision signal indicating that no disk has been detected (Step g), and the following step is effected.

When in the disk detecting operation the disk is detected and the flag is set, or no disk is detected for the predetermined period of time, the tray is put back in the magazine. The displacement of the tray is detected by the tray detecting switch S3. Then, the magazine is moved vertically until the magazine position detecting switch S4 detects the next tray, and then the tray is pulled out (Step h). The fact that the second disk has been taken out is stored in memory (Step i). The above-described operations, i.e., the tray extracting operation and the operation of detecting the presence of absence of a disk, are carried out repeatedly until all trays are pulled out (Step j).

Thereafter, in Step k, the processor refers to the flags set in Step f. If all flags are in the "off" state, the processor determines that no disk is available, and in Step 1 causes the mechanism to eject the magazine 1. The processor then detects whether or not the magazine has been ejected (Step m). When the magazine detecting switch S1 is placed in the "off" state, the processor determines that the ejection of the magazine has been accomplished, whereupon all operations are suspended.

When, on the other hand, a disk is available on any one of the trays in Step k, then a disk selecting operation for playing a disk is carried out.

As described above, according to the first embodiment of the invention, when the magazine is initially loaded, it is detected in advance whether or not a disk is available on any of the trays in the magazine, and when no disk is available, the magazine is ejected from the disk player. Therefore, the invention is most applicable to a disk player in which it is difficult to manually detect whether or not disks are available in the magazine, such as in the case where the disk drive device is disposed in the trunk of a vehicle and the control section is located near the operator's seat.

Figure 3:
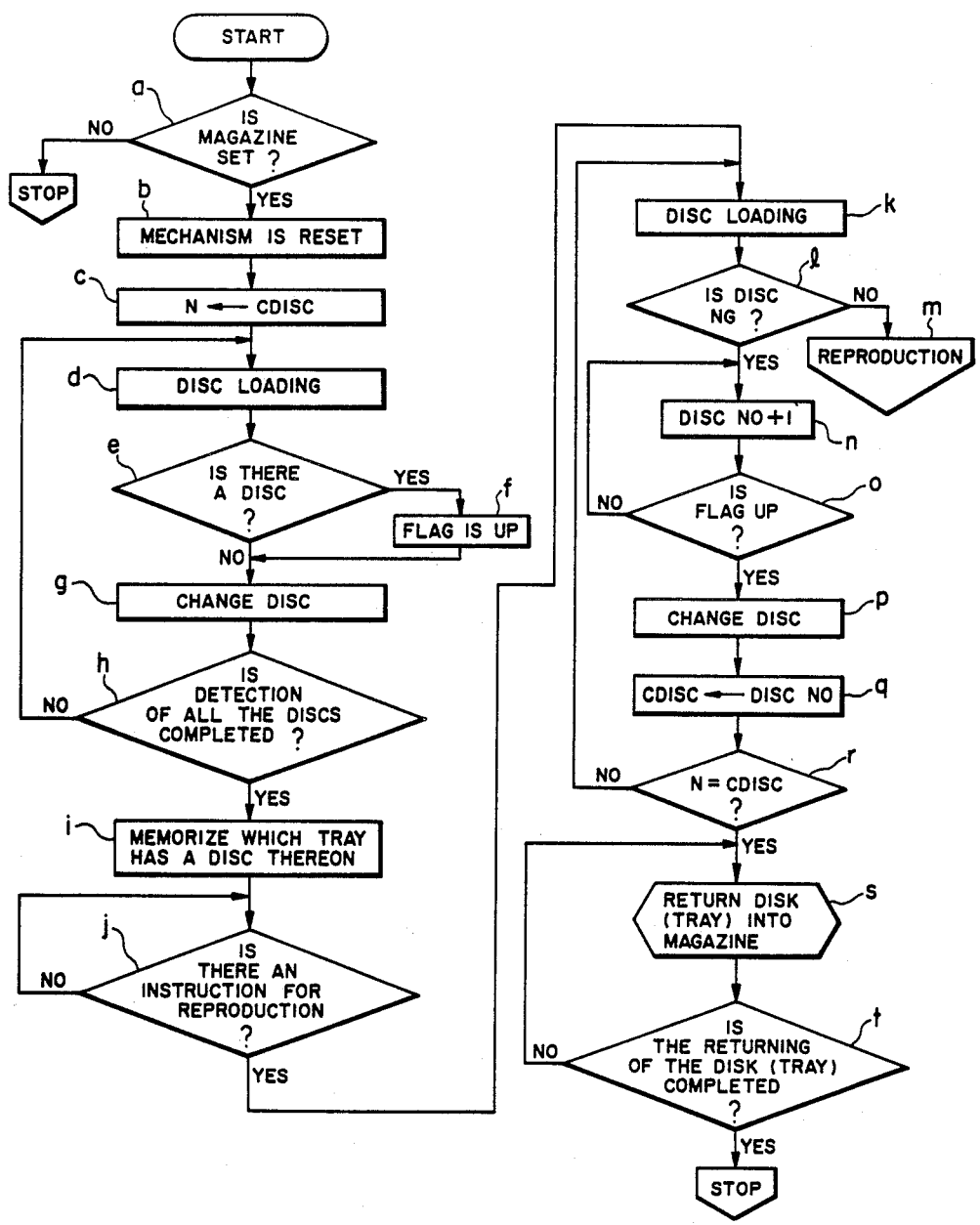
FIG. 3 is a flowchart showing functions of the disk player of FIG. 1 according to a second embodiment of the present invention.

The second embodiment of the present invention will be described hereinafter. The second embodiment is achieved by operating the processor in the system controller 20 as shown in the flowchart of FIG. 3. The second embodiment will thus be hereinafter described with reference to FIG. 3.

When the power switch is turned on, the processor determines whether or not the magazine 1 has been mounted on the magazine mount (Step a). When the magazine detecting switch S1 detects the presence of the magazine 1 and applies the detection signal to the processor 1, the latter determines that the magazine 1 has been mounted as required, and the next step is executed. If the magazine is not mounted, the operation is suspended (Step a').

In the next step, the magazine 1 is moved vertically to a position where the uppermost or lowermost tray can be pulled out (Step b). When the magazine position detecting switch S4 applies the magazine position signal to the processor, the next Step c is executed.

In this step, the fact that the disk on the extracted tray is the first one is stored in memory (Step c). Thereafter, a loading operation for the disk is carried out (Step d). During the loading operation, the processor detects whether or not a disk is present on the tray (Step e). When the disk detecting switch S2 detects the presence of a disk and outputs the detection signal, the processor determines that the disk has been detected, and sets a flag (Step f).

When, in detecting the presence or absence f a disk, the disk detecting switch S2 provides no output, and when the flag is set with a detected disk, the processor issues a disk exchange instruction. As a result, the tray is put back into the magazine. When the tray detecting switch S3 detects that the tray has been returned to the magazine 1, the latter is moved vertically. When the magazine position detecting switch S4 detects the next tray, the magazine 1 is stopped, and the operation of extracting that tray from the magazine is carried out (Step g).

The processor determines whether or not all trays have been searched (Step h), and if not, Step d is effected again so that the presence or absence of a disk is detected, and a flag is set whenever a disk is detected. When it is determined that all trays have been searched, the order of the tray holding the disk is stored in memory (Step i).

Thereafter, the processor detects whether or not a reproducing operation has been instructed (Step j). Upon detection of reproduction operation, the processor issues a disk loading instruction (Step k). After the disk is loaded, the processor determines whether or not the disk can be normally played back (Step 1). When it is determined that the disk can be normally played back, playback is started (or continued) (Step m). When it is determined that the disk cannot be normally played, it is repeatedly detected whether or not the disk can be played back in Step m, or the detection is carried out for a predetermined period of time. When it is determined that playback is impossible, one is added to the disk number for the purpose of playing back the second disk (Step n). Then, it is detected whether or not a flag has been set (Step o). In this connection, it is assumed that the fact that only the first, third and sixth trays have disks has been stored in memory Step i above. In this case, the second tray has no disk, and hence no flag can be set. Therefore, Step n is effected again so that one is added to the disk number, and it is detected again whether or not a flag has been set. Since a disk is available the flag is set. Therefore, the following Step p is executed.

In Step p, the disk is exchanged for the third disk, and the disk number in memory is changed; that is, it is changed to "3" (Step q). In Step r, the processor applies an instruction of loading the third disk and returns to Step k, whereupon the above-described operations are carried out again. When, in Step r, it is determined that playback of none of the disks can be performed, all the disks, in their respective trays are returned to their original positions (Step s). In the following Step t, it is detected whether or not the disks have been returned. When the trays detecting switch S3 detects that the trays have been returned, the processor suspends its operation.

As described above, in the second embodiment of the invention, when playback of a disk becomes impossible, another disk is placed on the turntable, and when it is determined that none of the disks can be played, the reproducing operation is suspended.

This eliminates the difficulty accompanying the conventional multidisk player in which, when the playback of a disk becomes impossible, the reproducing operation is suspended even if there remains another disk in the magazine; that is, the troublesome magazine exchanging operation can be eliminated according to the invention.

Figure 4:
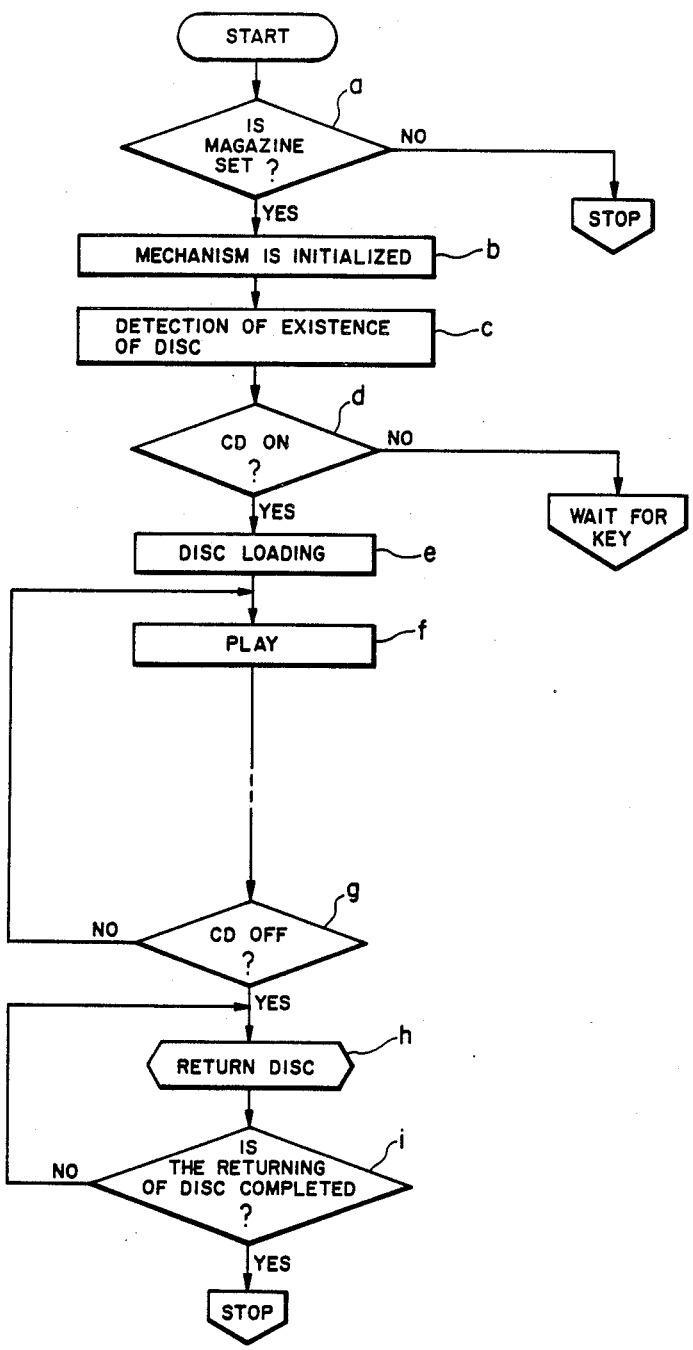
FIG. 4 is a flowchart showing functions of the disk player of FIG. 1 according to third embodiment of the present invention.

The third embodiment of the present invention will be described hereinafter. The third embodiment is achieved by operating the processor in the system controller 20 as shown in the flowchart of FIG. 4.

The third embodiment will be hereinafter described wit reference to FIG. 4.

When the power switch is turned on, the processor determines whether or not the magazine 1 has been mounted on the magazine mount (Step a). When the magazine detecting switch S1 detects the presence of the magazine 1 and applies the detection signal to the processor 1, the latter determines that the magazine 1 has been mounted as required, and the next step is executed.

In the next step, the magazine 1 is moved vertically to a position where the uppermost or lowermost tray can be extracted (Step b). When the magazine position detecting switch S4 applies the magazine position signal to the processor, the next Step c is carried out.

In Step c, it is detected whether or not a disk is on the tray to be ejected from the magazine. When the disk detecting switch S2 detects the disk, the next Step d is executed. In Step d, the processor determines whether or not the reproduction switch has been turned on. When the reproduction switch is turned on, the processor applies a disk loading signal to the player. In response to the disk loading signal, in the player, the disk is loaded on the turntable (Step e), and the player is set in a reproduction condition (Step f).

Under this condition, the processor detects whether or not a reproduction suspending operation is to be carried out (Step g). When it is determined that the reproduction suspending operation is to be carried out, the processor outputs a signal to return the disk to be tray. In response to this signal, the disk is returned to the tray and the tray is put back into the magazine (Step h). The processor detects whether or not the tray has been put back into the magazine (Step i). When the tray detecting switch S4 detects the fact that the tray has been put back into the magazine, the processor is released.

As described above, according to the third embodiment of the invention, when the magazine is loaded, a tray is pulled out of the magazine and the disk is set on the turntable for reproduction, and when the reproduction suspending operation is carried out during the playback of the disk, the disk player returns the disk to the tray and puts the tray back into the magazine. Therefore, even if the disk player is installed where it can be strongly vibrated, such as on a vehicle, the disk is prevented from striking against metal parts or the like of the disk player thus being free from the difficulties of the disk being scratched and noise is generated during reproduction, or the disk cannot be played at all.

What is claimed is:

1. A method for detecting the presence or absence of a disk in at least one of plural trays in a magazine set into a disk player, comprising the steps of:
    detecting when said magazine has been set in said disk player;
    conveying said trays one at a time from said magazine to a playing position in response to detection of said magazine in said detection step;
    detecting for each tray thus conveyed whether or not a disk is on said tray; and
    ejecting said magazine when no disk is detected.

2. A disk player for playing disks contained in a magazine which holds a plurality of said disks, said disk player comprising:
    detecting means for detecting whether said magazine contains a disk and for providing an output when no disks are contained within said magazine; and
    ejecting means responsive to said output from said detecting means for automatically ejecting said magazine from said disk player.

* * * * *